US008609785B2

(12) United States Patent
Vergelati et al.

(10) Patent No.: US 8,609,785 B2
(45) Date of Patent: Dec. 17, 2013

(54) MODIFIED POLYAMIDE COMPOSITION CONTAINING AT LEAST ONE PHENOLIC COMPOUND

(75) Inventors: Caroll Vergelati, Saint-Baudille de la Tour (FR); Olivier Andres, Mions (FR); Vincent Schanen, Lyons (FR); Ludovic Odoni, Rillieux-la-Pape (FR); Paul Sotta, Lyons (FR); Didier Long, Sainte-Foy-lès-Lyon (FR)

(73) Assignees: Rhodia Operations, Aubervilliers (FR); C.N.R.S., Paris (FR)

( * ) Notice: Subject to any disclaimer, the term of this patent is extended or adjusted under 35 U.S.C. 154(b) by 0 days.

(21) Appl. No.: 13/503,337

(22) PCT Filed: Oct. 18, 2010

(86) PCT No.: PCT/EP2010/065647

§ 371 (c)(1), (2), (4) Date: Jul. 9, 2012

(87) PCT Pub. No.: WO2011/048055

PCT Pub. Date: Apr. 28, 2011

(65) Prior Publication Data

US 2012/0264864 A1 Oct. 18, 2012

(30) Foreign Application Priority Data

Oct. 20, 2009 (FR) ..................................... 09 57322

(51) Int. Cl.
*C08L 77/00* (2006.01)

(52) U.S. Cl.
USPC .......................................... 525/427; 525/429

(58) Field of Classification Search
USPC ................................................. 525/427, 429
See application file for complete search history.

(56) References Cited

U.S. PATENT DOCUMENTS

| | | | | |
|---|---|---|---|---|
| 3,697,310 | A * | 10/1972 | Kurihara et al. | 427/389.9 |
| 2003/0065126 | A1 * | 4/2003 | Katano et al. | 528/129 |
| 2010/0227962 | A1 | 9/2010 | Vergelati et al. | |

FOREIGN PATENT DOCUMENTS

| | | | |
|---|---|---|---|
| EP | 472446 | A * | 2/1992 |
| FR | 2 921 069 | A1 | 3/2009 |
| GB | 1 092 086 | | 11/1967 |
| WO | WO 2009/155747 | A1 | 12/2009 |

OTHER PUBLICATIONS

International Search Report corresponding to PCT/EP 2010/065647 issued Feb. 2, 2011.

* cited by examiner

*Primary Examiner* — Peter Szekely
(74) *Attorney, Agent, or Firm* — Dentons US LLP

(57) ABSTRACT

The use of a phenolic compound for producing a modified polyamide having enhanced mechanical properties is described. A polyamide composition including at least such phenolic compound and optionally reinforcing or filler loads is also described. The composition is preferably a composition for molding, for example in the form of granules or powder, that can be used for the production of articles by injection-molding.

11 Claims, No Drawings

MODIFIED POLYAMIDE COMPOSITION CONTAINING AT LEAST ONE PHENOLIC COMPOUND

CROSS-REFERENCE TO PRIOR APPLICATIONS

This application is a National Stage of PCT/EP 2010/065647, filed Oct. 18, 2010, and designating the United States (published in the French language on Apr. 28, 2011, as WO 2011/048055 A1; the title and abstract were also published in English), which claims priority of FR 0957322, filed Oct. 20, 2009, each hereby expressly incorporated by reference in its entirety and each assigned to the assignee hereof.

The present invention relates to the use of a phenolic compound in the manufacture of a modified polyamide having enhanced mechanical properties. The invention also relates to a polyamide composition comprising at least one such phenolic compound and optionally reinforcing or bulking fillers. The composition is preferably a composition to be molded, for example in the form of granules or powder, used for the manufacture of articles by an injection molding process.

Industrial polyamides are used to prepare numerous articles in various fields, such as the motor vehicle field, where specific properties of stiffness, impact strength, dimensional stability, in particular at a relatively high temperature, surface appearance, density and weight are particularly desired. The choice of a material for a given application is generally guided by the level of performance required with regard to certain properties and by its cost. Specifically, a search is always underway for novel materials capable of meeting a specification in terms of performance and/or costs.

Furthermore, it is known to use novolak resin in polyamide compositions to reduce their water uptake and to increase the dimensional stability of the articles formed. However, novolak resin brings about a significant deterioration in some mechanical properties of the polyamide matrix. There thus existed a need to develop polyamide compositions exhibiting a very good compromise between water uptake and mechanical properties.

The applicant company has just discovered, entirely surprisingly, that the use of a specific phenolic compound in a polyamide composition makes it possible to obtain novel compromises in properties with regard to the control of the dimensional stability, the signature of which with regard to the material is a better inhibition of water absorption, and much better mechanical properties.

The present invention thus relates to a polyamide composition comprising at least one polyamide and one polymeric phenolic compound of the invention, and optionally reinforcing or bulking fillers and optionally additives conventionally used in the field.

The invention also relates to the use of a polymeric phenolic compound of the invention as impact reinforcer for the polyamide. The invention thus also relates to the use of such a phenolic compound in the manufacture of a modified polyamide exhibiting enhanced mechanical properties.

The present invention also relates to a polymeric phenolic compound comprising at least units of formula (I):

(I)

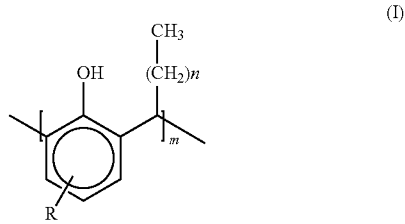

in which R represents a hydrogen atom or a linear or branched alkyl group comprising from 1 to 20 carbon atoms and optionally comprising heteroatoms, m is between 6 and 15 and n is between 5 and 22.

Preferably, the linear or branched alkyl group comprises from 1 to 10 carbon atoms. Preferably, the heteroatoms are oxygen or nitrogen. R is more preferably a hydrogen atom, a methyl, an ethyl, a propyl, a butyl or an octyl.

m is more preferably between 8 and 12 and can take in particular the values 8, 9, 10, 11 or 12, or any interval between these values. n is more preferably between 10 and 15, in particular the values 10, 11, 12, 13, 14 or 15, or any interval between these values.

The phenolic compound of the invention can also be a polymer comprising at least units of formula (I) and also units of formula (II):

(II)

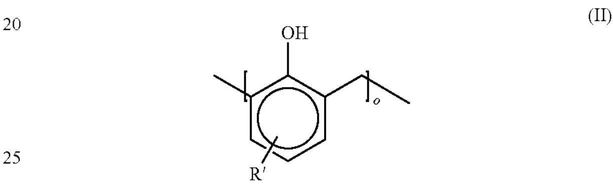

in which R' represents a hydrogen atom or a linear or branched alkyl group comprising from 1 to 20 carbon atoms and optionally comprising heteroatoms, and o is between 6 and 15. R and R' can be independent of one another or equivalent. o can take in particular the values 6, 7, 8, 9, 10, 11, 12, 13, 14 or 15, or any interval between these values.

This compound can in particular then be a random polymer.

Blends of phenolic compounds according to the invention can be used in particular in the preparation of the composition according to the invention.

The polymeric phenolic compound of the invention, comprising at least units represented by the formula (I) and optionally units represented by the formula (II), can be manufactured in various ways. Use may in particular be made of the processes conventionally used for the manufacture of novolak resins.

The invention also relates to a process for the manufacture of a polymeric phenolic compound comprising at least one stage of condensation in the presence of at least one phenolic compound with an aldehyde comprising from 7 to 25 carbon atoms.

The invention also relates for the manufacture of a polymer comprising at least units represented by the formula (I) and optionally units represented by the formula (II) comprising at least one stage of condensation, in the presence of at least one phenolic compound, with an aldehyde comprising from 7 to 25 carbon atoms and formaldehyde.

The molar ratio of the aldehyde comprising from 7 to 25 carbon atoms to the formaldehyde is preferably between 0.25 and 1.

The temperature of the reaction is generally carried out at a temperature of between 50 and 250° C., preferably between 80 and 160° C.

Use may generally be made, as solvent, of any solvent which is unreactive under the synthesis conditions, ideally solvents which make it possible to remove water by azeotropic distillation, such as toluene, chlorobenzene or orthodichlorobenzene. However, the use of a solvent is not essential.

These condensation reactions are generally catalyzed by an acid or a base. Use may be made of different types of catalysts, such as HCl, $H_2SO_4$, $H_3PO_4$, oxalic acid, formic acid, acetic acid, NaOH and KOH, for example.

The phenolic compounds can be chosen, alone or as a mixture, from phenol, cresol, xylenol, naphthol, alkylphenols, such as butylphenol, (tert-butyl)phenol or isooctylphenol, nitrophenol, phenylphenol, resorcinol and bisphenol A, or any other substituted phenol.

Use may in particular be made of the following aldehydes: heptaldehyde, octyl aldehyde (or caprylic aldehyde or octanal), nonyl aldehyde (or nonanal), decaldehyde (or decanal), undecaldehyde, dodecyl aldehyde (or laurinaldehyde), palmitaldehyde (or hexadecanal) or stearaldehyde (or octadecanal).

The compounds of the invention advantageously have a molecular weight of between 1500 and 3000 g/mol.

The polyamide composition according to the invention generally comprises from 1 to 20% by weight of phenolic compound, preferably from 2 to 8% by weight, with respect to the total weight of the composition.

According to the present invention, the polyamide composition can be obtained in various ways known for the addition of fillers and additives to a polyamide composition.

It is possible, for example, to manufacture it by addition of the phenolic compound in melt polymerization of the polyamide, in the presence of the monomers of the polyamide. It is also possible to add the phenolic compound in hot blending with the polyamide, in particular formed or partially formed, for example in the extruder, in particular with other compounds. It is also possible to add the phenolic compound in the solid phase, in particular during a polyamide postcondensation.

The polyamide of the invention can be a semicrystalline or amorphous polyamide or copolyamide, such as aliphatic polyamides, semiaromatic polyamides and more generally linear polyamides obtained by polycondensation between an aliphatic or aromatic diacid and an aromatic or aliphatic primary diamine, polyamides obtained by condensation of a lactam or of an amino acid, or linear polyamides obtained by condensation of a mixture of these various monomers.

More specifically, these copolyamides can be, for example, poly(hexamethylene adipamide), polyphthalamides obtained from terephthalic and/or isophthalic acid, or copolyamides obtained from adipic acid, hexamethylenediamine and caprolactam.

The polyamide is preferably chosen from the group consisting of polyamides obtained by polycondensation of at least one linear dicarboxylic acid with a linear or cyclic diamine, such as PA 6.6, PA 6.10, PA 6.12, PA 12.2 or PA 4.6, or between at least one aromatic dicarboxylic acid and a linear or aromatic diamine, such as polyterephthalamides, polyisophthalamides or polyaramides, and polyamides obtained by polycondensation of at least one amino acid with itself, it being possible for the amino acid to be generated by the hydrolytic opening of a lactam ring, such as, for example, PA 6, PA 7, PA 11 or PA 12.

The composition of the invention can also comprise copolyamides derived in particular from the above polyamides, or the blends of these polyamides or copolyamides.

The preferred polyamides are chosen from the group consisting of: PA 66, PA 610, PA 612, PA 6.66, PA 46, MXD6, PA 66/6T, PA 6, PA 11 and PA 12.

Use is generally made of polyamides with a molecular weight suitable for injection molding processes, although it is also possible to use polyamides having lower or higher viscosities.

The polyamide can in particular be a polymer comprising star or H macromolecular chains, a branched or hyperbranched polymer, and, if appropriate, a polymer comprising linear macromolecular chains. Polymers comprising such star or H macromolecular chains are, for example, described in the documents FR 2 743 077, FR 2 779 730, U.S. Pat. No. 5,959,069, EP 0 632 703, EP 0 682 057 and EP 0 832 149.

The polyamide can be a polymer of random tree type, preferably a copolyamide exhibiting a random tree structure. These copolyamides with a random tree structure and their process of preparation are described in particular in the document WO 99/03909. The matrix of the invention can also be a composition comprising a linear thermoplastic polymer and a star, H and/or tree thermoplastic polymer as described above. The matrix of the invention can also comprise a hyperbranched copolyamide of the type of those described in the document WO 00/68298. The composition of the invention can also comprise any combination of linear, star, H and tree thermoplastic polymer and hyperbranched copolyamide as described above.

The composition according to the invention preferably exhibits from 30 to 95% by weight of polyamide, preferably from 40 to 80% by weight, with respect to the total weight of the composition.

The composition can also comprise, depending on the final product desired, a blend of polyamide and one or more other polymers, such as, for example, another polyamide, polyethylene, polystyrene, polypropylene, ABS resin, polycarbonate, polyphenylene sulfide, polyphenylene oxide, polyacetal, polysulfone, polyethersulfone, polyetherimide, polyetherketone, a polylactic acid resin, a polysulfone resin, an elastomeric resin or blends of these.

The reinforcing or bulking fillers according to the present invention can be, for example, fibrous fillers and non-fibrous fillers.

Mention may be made, as fibrous fillers, of glass fibers, carbon fibers, natural fibers, aramid fibers and nanotubes, in particular carbon nanotubes. Mention may be made, as natural fibers, of hemp and flax. Mention may in particular be made, among nonfibrous fillers, of all lamellar particulate fillers and/or exfoliable or nonexfoliable nanofillers, such as alumina, carbon black, aluminosilicate clays, montmorillonites, zirconium phosphate, kaolin, calcium carbonate, diatomaceous earths, graphite, mica, silica, titanium dioxide, zeolites, talc, wollastonite, polymeric fillers, such as, for example, dimethacrylate particles, glass beads or glass powder.

It is perfectly possible, according to the invention, for the composition to comprise several types of reinforcing fillers. Preferably, the most widely used filler can be glass fibers, of the "chopped" type, in particular having a diameter between 7 and 14 μm. These fillers can exhibit a surface sizing which provides for the mechanical adhesion between the fibers and the polyamide matrix.

The concentration by weight of the reinforcing or bulking fillers is advantageously between 1 and 60% by weight, with respect to the total weight of the composition, preferably between 15 and 50% by weight.

The composition according to the invention can additionally comprise additives conventionally used in the manufacture of polyamide compositions. Thus, mention may be made of lubricants, flame-retardants, plasticizers, nucleating agents, impact modifiers, catalysts, light and/or heat stabilizers, antioxidants, antistatics, colorants, mattifying agents, molding aids or other conventional additives.

It is possible in particular to add, to the polyamide composition, agents which modify the impact strength. It is generally elastomeric polymers which can be used for this purpose. Agents which modify the impact strength are generally defined as having an ASTM D-638 tensile modulus of less than approximately 500 MPa. Examples of suitable elastomers are ethylene/acrylic ester/maleic anhydride copolymers, ethylene/propylene/maleic anhydride copolymers or ethylene/propylene/diene monomer (EPDM) copolymers with optionally a grafted maleic anhydride. The concentration by weight of elastomer is advantageously between 0.1 and 30%, with respect to the total weight of the composition.

Preference is given in particular to the impact-modifying agents comprising functional groups which react with the polyamide. Mention may be made, for example, of ethylene, acrylic ester and glycidyl methacrylate terpolymers, ethylene and butyl ester acrylate copolymers, ethylene, n-butyl acrylate and glycidyl methacrylate copolymers, ethylene and maleic anhydride copolymers, styrene/maleimide copolymers grafted with maleic anhydride, styrene/ethylene/butylene/styrene copolymers modified with maleic anhydride, styrene/acrylonitrile copolymers grafted with maleic anhydride, acrylonitrile/butadiene/styrene copolymers grafted with maleic anhydride, and their hydrogenated versions. The proportion by weight of these agents in the overall composition is in particular between 0.1 and 40%.

These fillers and additives can be added to the modified polyamide by normal means suited to each filler or additive, such as, for example, during the polymerization or in melt blending.

The materials and compositions of the invention are generally obtained by blending the various constituents under hot conditions, for example in a single- or twin-screw extruder, at a temperature sufficient for maintaining the polyamide resin as a molten medium, or under cold conditions, in a mechanical mixer in particular. Generally, the blend obtained is extruded in the form of rods which are cut into pieces in order to form granules. The compounds can be added at any point in the process for the manufacture of the plastic material, in particular by hot or cold blending with the plastic matrix. The addition of the compounds and the additives, such as the phenolic compounds, can be carried out by addition of these compounds to the molten plastic matrix in the pure form or in the form of a concentrated blend in a matrix, such as, for example, a plastic matrix.

The composition is preferably a composition to be molded, for example in the form of granules or powder, and used in particular for the manufacture of articles by an injection molding process. The composition according to the invention can be used for any process for the forming of plastics, such as, for example, molding processes, in particular injection molding, rotational molding, sintering or casting, or extrusion processes, such as extrusion/blow molding and film-forming, or also spinning processes. The invention thus also relates to processes for the manufacture of molded or extruded articles by forming a composition of the invention.

The present invention also relates in particular to an injection-molding process in which a composition according to the invention, in particular in the form of granules, is introduced into an injection-molding device and the molding is carried out.

The use of the compositions according to the invention is particularly advantageous in the context of the manufacture of articles for the motor vehicle or electrical industry.

A specific language is used in the description so as to facilitate understanding of the principle of the invention. Nevertheless, it should be understood that no limitation of the scope of the invention is envisaged by the use of this specific language. Modifications and improvements can in particular be envisaged by a person conversant with the technical field concerned on the basis of his own general knowledge.

The term "and/or" includes the meanings "and", "or" and all the other possible combinations of the elements connected to this term.

Other details or advantages of the invention will become more clearly apparent in the light of the examples given below purely by way of indication.

EXPERIMENTAL PART

Example 1

Synthesis of a Polymer Comprising Units of Formula (I)

The following were charged to a fully stirred reactor: 141 g (1.5 mol) of phenol and 276 g (1.5 mol) of laurinaldehyde. 4.9 g of a 50% solution of NaOH in water are then added as catalyst. The temperature is raised to 100-110° C. and a homogeneous liquid medium is obtained. This medium is maintained at 100-110° C. for 14 h. The unreacted reactants and the water formed are removed by vacuum distillation (1-10 mbar, 120° C.). 56 g of distillate are obtained. The product obtained is a viscous liquid (311 g) at 80° C. and has an orangey yellow color.

The product is characterized by $^{1}H$ NMR in $CDCl_3$: multiplets at 7.3/6.9/4.8/0.8 to 2.2.

Example 2

Synthesis of a Polymer Comprising Units of Formula (I) and of Formula (II)

Synthesis by basic catalysis. 94 g (1 mol) of phenol, 138.2 g (0.75 mol) of laurinaldehyde and 60.8 g (0.75 mol) of a 37% by weight HCOH solution were charged to a fully stirred reactor. 3.3 g of a 50% solution of NaOH in water are then added as catalyst. The temperature is raised to 90-100° C. with continuous distillation of the water introduced and formed. The medium is maintained at 90-100° C. for 6 h. The medium has two phases. The reaction medium is concentrated under vacuum (10 mbar) at a temperature of 90° C. Some solids are separated. The product obtained is a viscous liquid (195 g) at 80° C. and is orangey in color.

The product is characterized by $^{1}H$ NMR in $CDCl_3$: multiplets at 8.8/6.8 to 5.4/4.8/2.2 to 0.5.

Example 3

Synthesis of a Polymer Comprising Units of Formula (I) and of Formula (II)

Synthesis by acid catalysis. The following were charged to a fully stirred reactor:

phenol: 94 g (1 mol)

1% by weight of oxalic acid

The temperature is raised to 100° C. A mixture of 138.2 g (0.75 mol) of laurinaldehyde and 60.8 g (0.75 mol) of a 37% by weight HCOH solution is subsequently run in over several hours. The medium is maintained at 100° C. for 5 h. The reaction is finished by gradually raising the temperature over several hours to 150-180° C. The reaction medium is concentrated under vacuum (10 mbar) in a temperature window of 100-150° C. The product obtained is liquid (195 g) and viscous at 80° C. and is orangey in color.

The product is characterized by $^1H$ NMR in $CDCl_3$: multiplets at 8.8/6.8 to 5.4/4.8/2.2 to 0.5.

Both types of resin have number-average molecular weights (Mn) of the order of 2000-2200 g/mol. This corresponds to oligomeric structures with a degree of polymerization of between 8 and 12 (GPC analysis).

Example 4

Manufacture of the Compositions

Compositions based on polyamide (PA 66, 27 AD 1 from Rhodia, having a VN of 140 ml/g according to standard ISO 307) and on 4% by weight of novolak resin (phenol/formaldehyde, Rhenosin PR95) or on a compound of example 1 or 2 are obtained by extrusion on a Prism 25D twin-screw miniextruder. The processing characteristics are as follows:

Twin-screw miniextruder: Prism 25D, with
a temperature profile: 275-280-275-275-275° C.
screw speed (rpm): 250
motor force (N·m): 16
vacuum: −0.3 bar The rods coming out of the extruder are run into a water cooling tank and subsequently granulated. Test specimens are produced by injection molding in the following way:

BOY 12M minipress, 12 tonnes, 18 mm screw
T(° C.) barrel: from 270 to 285
T(° C.) mold: 70
Injection rate (m/s): 100
Injection pressure (bar): 50
Hold pressure (bar): 25
Backpressure (bar): 3
Screw speed (rpm): 220

The test specimens are subsequently conditioned at two distinct relative humidities RH0 and RH50.

Example 5

Analysis of the Formulations

Various tests were carried out on the formulations produced in example 4. The results are expressed in the following table 1:

TABLE 1

| | Systems | | | |
|---|---|---|---|---|
| | PA 6,6 Control | +4% Resin Novolak | +4% Resin Ex. 1 | +4% Resin Ex. 2 |
| Water uptake (RH50) (% w/w) | 3.06 (—) | 2.77 (−9.2%) | 2.76 (−9.4%) | 2.83 (−7.4%) |
| Impact strength RH0 ($kJ/m^2$) | 5.0 (—) | 3.5 (−30%) | 7.2 (+44%) | 5.5 (+10%) |
| Impact strength RH50 ($kJ/m^2$) | 25.0 (—) | 11.5 (−54%) | 21.0 (−16%) | 23.0 (−8%) |

The water absorption measurements are carried out according to standard ISO 1110.

The impact strength measurements are carried out according to standard ISO 179-1/1eA.

At RH0, the compositions based on the new resin typologies exhibit an impact strength which is greater to much greater than that of the control PA 6,6 matrix and also than that of a PA 6,6 matrix to which a conventional novolak resin has been added. At RHSO, although much less plasticized than the control PA 6,6 matrix (lower water uptake), the compositions based on these new resins exhibit an impact strength similar to that of the reference matrix. Furthermore, it is found that the composition based on a conventional novolak resin is more disadvantaged with regard to this property.

The invention claimed is:

1. A polyamide composition comprising at least one polymeric phenolic compound comprising at least units of formula (I):

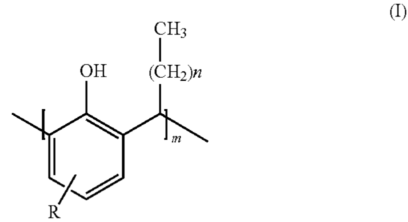

in which R is a hydrogen atom or a linear or branched alkyl group comprising from 1 to 20 carbon atoms and optionally comprising heteroatoms, m is from 6 to 15 and n is from 5 to 22.

2. The composition as defined by claim 1, comprising from 1% to 20% by weight of phenolic compound, with respect to the total weight of the composition.

3. The composition as defined by claim 1 comprising from 30% to 95% by weight of polyamide, with respect to the total weight of the composition.

4. The composition as defined by claim 1 comprising reinforcing or bulking fillers.

5. The composition as defined by claim 1 comprising agents which modify the impact strength.

6. The polyamide composition as defined by claim 1, wherein m is from 8 to 12.

7. The polyamide composition as defined by claim 1, wherein n is from 10 to 15.

8. The polyamide composition as defined by claim 1, wherein the at least one polymeric phenolic compound further comprises units of formula (II):

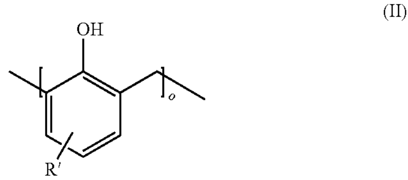

in which R' is a hydrogen atom or a linear or branched alkyl group comprising from 1 to 20 carbon atoms and optionally comprising heteroatoms, and o is from 6 to 15.

9. The polyamide composition as defined by claim 1, said at least one polymeric phenolic compound having a molecular weight of from 1500 g/mol to 3000 g/mol.

10. A method of preparing a molded or extended article, the method comprising forming the molded or extruded article with a polyamide composition as defined by claim 1.

11. A molded or extruded article comprising a polyamide composition as defined by claim 1.

* * * * *